May 20, 1958 J. YOUNG, JR 2,835,453
STATOR WINDER
Filed Jan. 23, 1957 8 Sheets-Sheet 2

May 20, 1958     J. YOUNG, JR     2,835,453
STATOR WINDER

Filed Jan. 23, 1957     8 Sheets-Sheet 3

INVENTOR
JOHN YOUNG, JR
BY
ATTORNEY

May 20, 1958

J. YOUNG, JR 2,835,453

STATOR WINDER

Filed Jan. 23, 1957

INVENTOR.
JOHN YOUNG, JR
BY
ATTORNEY

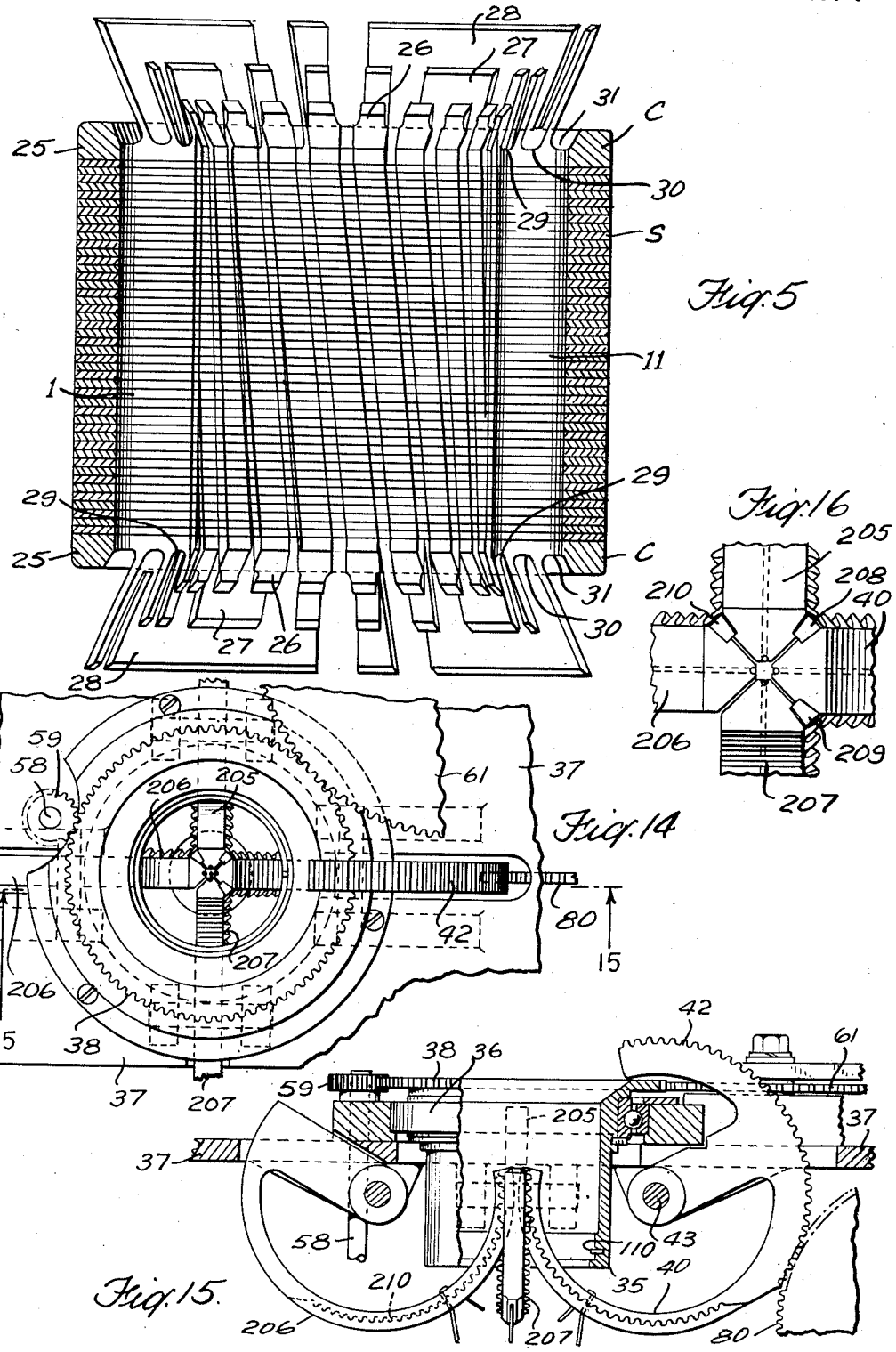

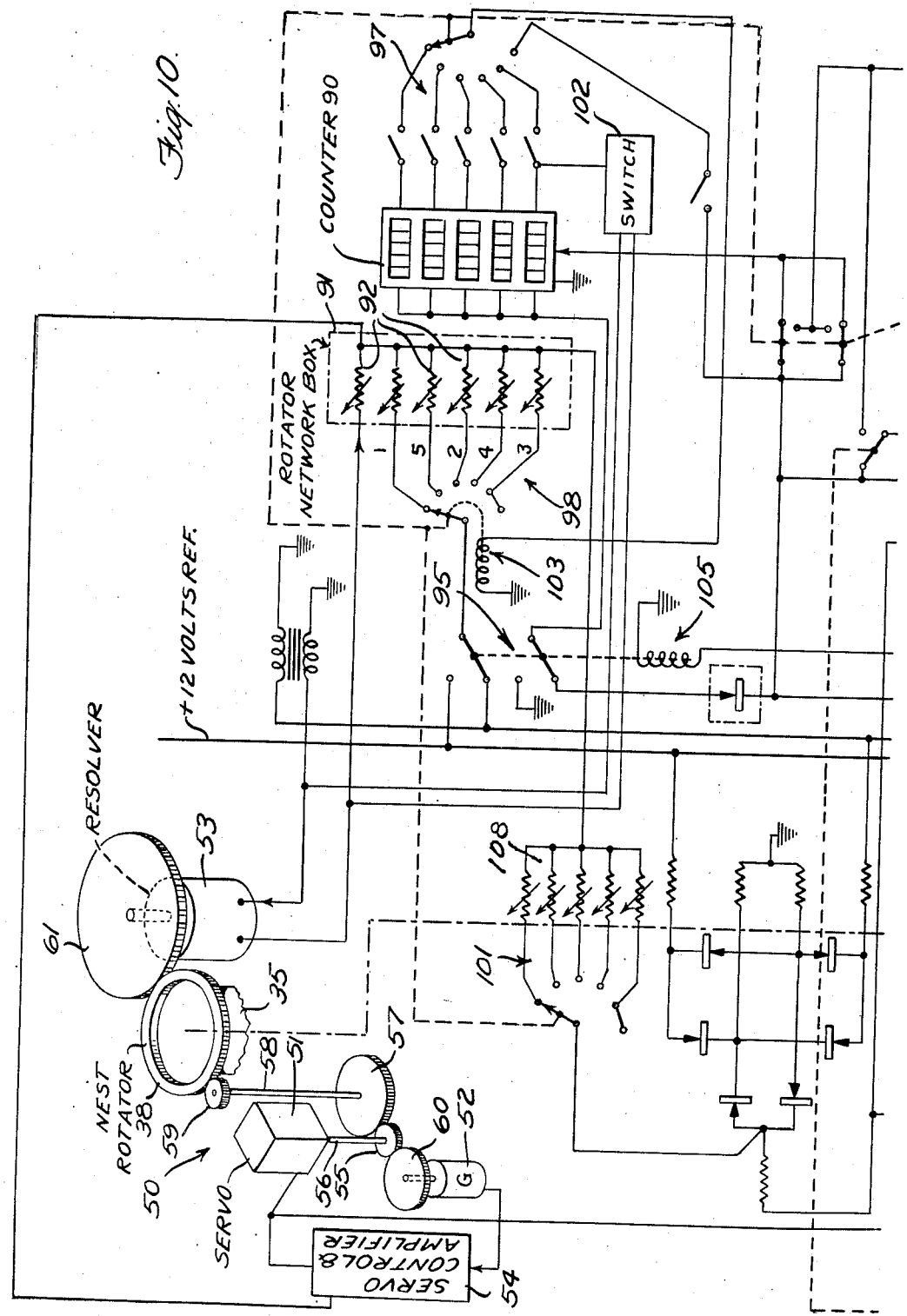

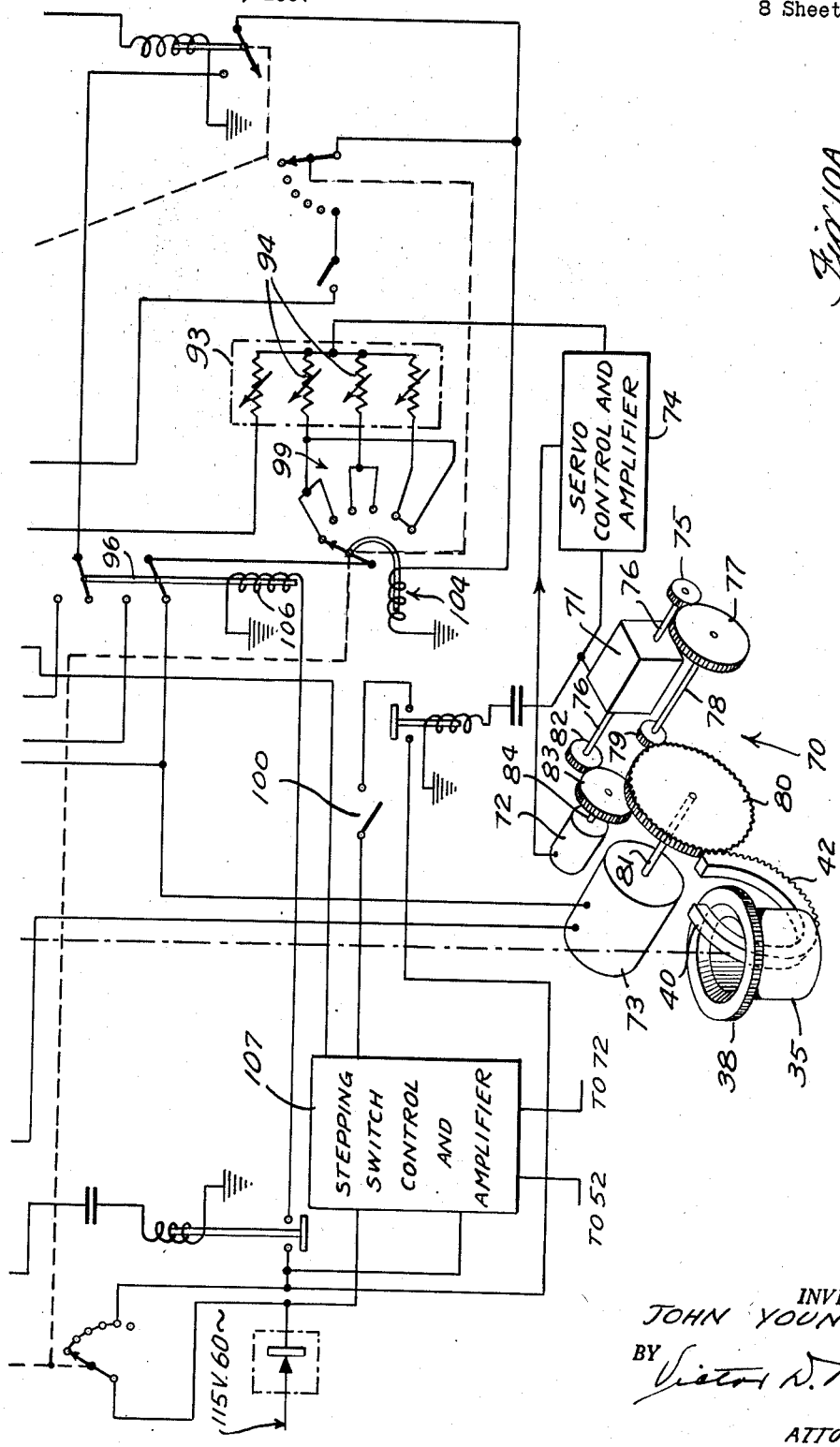

United States Patent Office 2,835,453
Patented May 20, 1958

2,835,453
STATOR WINDER

John Young, Jr., Corona, N. Y., assignor to Sperry Rand Corporation, Ford Instrument Company Div., Long Island City, N. Y., a corporation of Delaware Application January 23, 1957, Serial No. 635,756

17 Claims. (Cl. 242—1.1)

This invention relates to a mechanism for automatically winding the stators and rotors of small motors, generators, resolvers, synchros, and similar electrical apparatus.

The principal object of this invention is to make cheaper stators and rotors, to wind more uniformly, to wind in a smaller space, to wind without having to tie the ends, to wind directly on the stator or rotor rather than on a bobbin and then feed it on to the stator or rotor, to prevent mishandling by decreasing the number of operations on the wire itself, to wind more uniformly from one stator or rotor to the next, to wind automatically, and to provide a winder which is flexible and therefor can be used to wind any number of different types of stators and rotors, and to wind more quickly.

Another object of the invention is to provide a winding mechanism which is fully automatic in operation and which winds the wire directly into the slots of the stator and/or rotor shell, thereby greatly decreasing the time previously required to wind a stator or rotor and reducing the cost thereof.

Another object of the invention is to provide a mechanism of the aforesaid character which is operative to uniformly wind successive stators and rotors.

Another object of the invention is to provide a mechanism of the aforesaid character which is operative to more evenly distribute the wire loops about the ends of the stator and rotor between the shell slots.

Another object of the invention is to provide a winding mechanism which can be used to automatically wind various types of stators and rotors.

Other and more limited objects of the invention will be apparent from the following specification and the accompanying drawing forming a part thereof in which:

Fig. 5 is a vertical sectional view through the shell of Fig. 3 with end caps applied to each end thereof, the plane of the section being indicated by the line 5—5 on Figs. 3 and 4;

Fig. 7 is an enlarged fragmentary detail sectional view through the winding finger showing the threading nozzle, the plane of the section being indicated by the line 7—7 on Fig. 2;

Figures 11, 13:
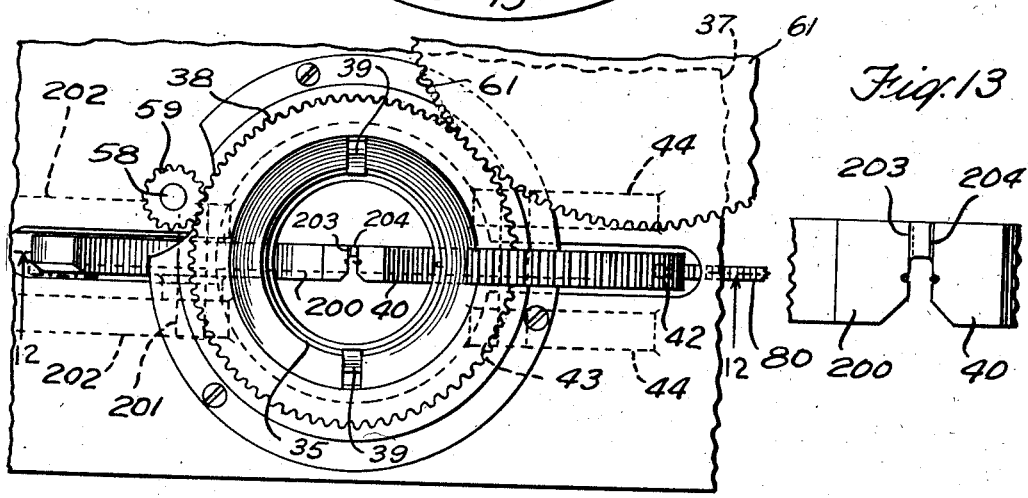
Figure 12:
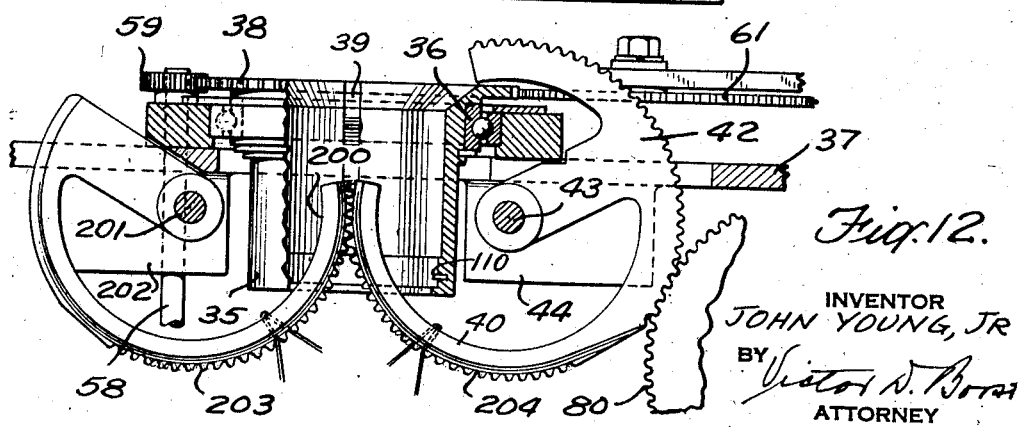
Figure 9:
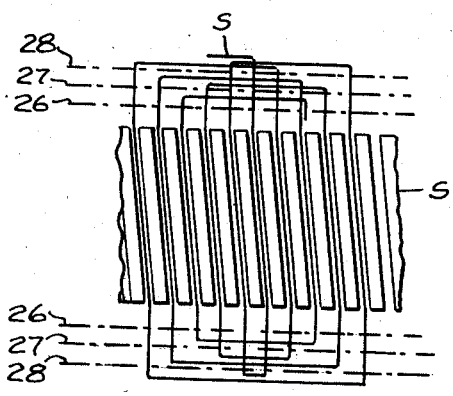
Fig. 9 is a diagrammatic view in elevation further illustrating the sequential winding of selected pairs of shell slots.
Figure 18:
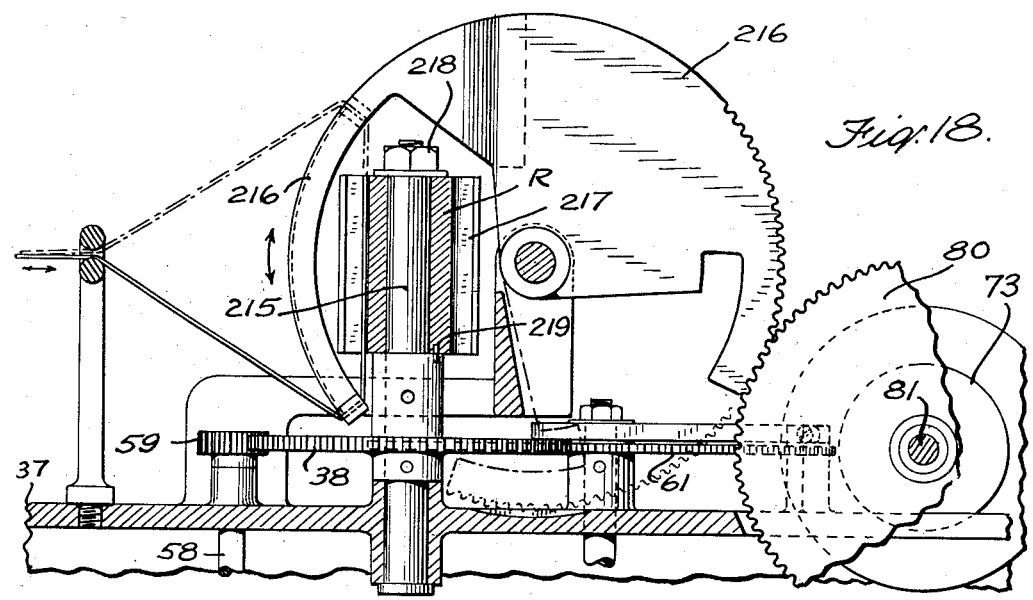
Figure 17:
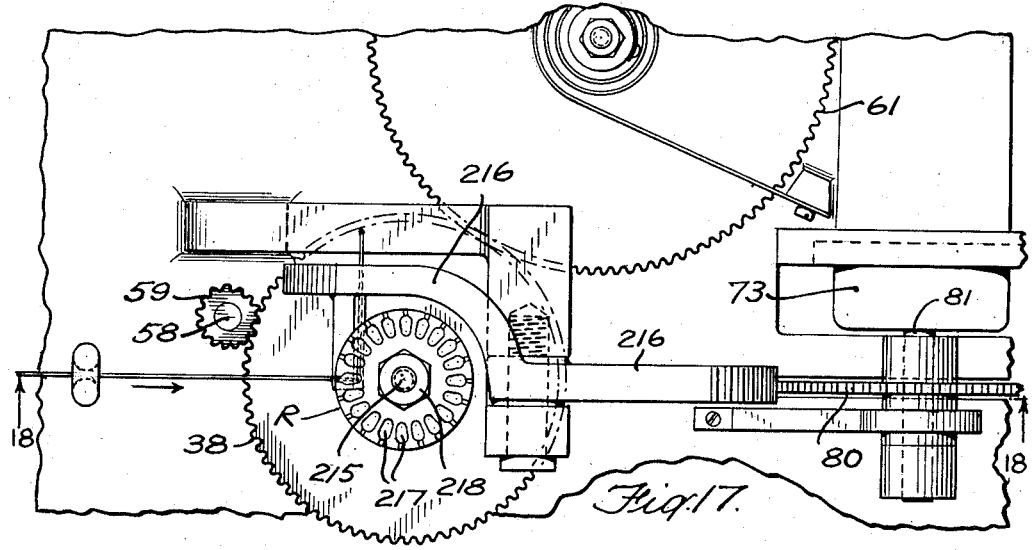
Figure 8:
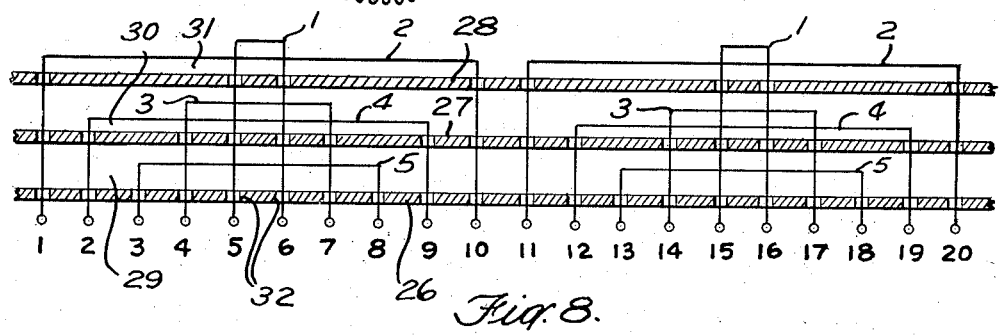
Fig. 8 is a diagrammatic view in plan illustrating the order in which selected pairs of shell slots are successively wound.

Figs. 10 and 10A together constitute a diagrammatic layout of the winding mechanism and the electronic control mechanism therefor;

Fig. 11 is a fragmentary plan view of a modified form of the winding mechanism of Figs. 1 to 10 in which two winding fingers are employed;

Fig. 12 is a fragmentary vertical sectional view through the mechanism shown in Fig. 11 taken substantially on the line 12—12 of Fig. 11;

Fig. 13 is an enlarged fragmentary detail plan view showing the manner in which the two winding fingers of Figs. 11 and 12 are geared together for operation in unison;

Fig. 14 is a fragmentary plan view of still another modified form of the winding mechanism of Figs. 1 to 10 in which four winding fingers are employed;

Fig. 15 is a fragmentary vertical sectional view through the mechanism shown in Fig. 14 taken substantially on the line 15—15 of Fig. 14;

Fig. 16 is an enlarged fragmentary detail plan view showing the manner in which the four winding fingers of Figs. 14 and 15 are geared together for operation in unison;

Fig. 17 is a fragmentary plan view showing the mechanism of Figs. 1 to 10 adapted for the winding of slotted rotor shells; and Fig. 18 is a fragmentary vertical sectional view through the mechanism shown in Fig. 17 taken substantially on the line 18—18 of Fig. 17.

In winding stator shells in accordance with my invention I employ a pair of similar end caps one of which is secured to each end of a stator shell prior to winding. The preferred embodiment of my invention, as shown and described herein, comprises generally an open ended rotatably mounted vertical cylindrical cage in which a stator with the end caps thereon is secured in definite fixed position for rotation therewith; an accurate winding finger which extends up through the cage and a stator shell therein and is adapted to be moved up and down, within a stator shell during operation; and driving and control means by which the cage and finger are actuated in definite predetermined sequential timed relation with respect to each other.

The end caps each comprises a base having three concentric annular grooves or zones in the upper surface thereof and three upwardly and outwardly extending concentric conical flanges one of which is disposed around the inner edge of the grooves. These flanges progressively increase in height from the innermost flange outwardly, and are provided with radially extending vertical slots which are adapted to register with certain of the slots in the stator shell in which the cap is applied.

The cage is rotatably supported adjacent the upper end thereof for rotation about a vertical axis by a suitable anti-friction bearing which is secured in fixed position on the top of a table. The cage is provided with clamping means by which a stator shell is held in definite fixed position therein, and a gear around the upper end thereof through which the cage is rotated back and forth during operation.

The winding finger is carried by a segmental gear which is radially disposed with respect to the cage and is adapted to be rotated back about a horizontal axis. The finger is provided with a threading nozzle through which wire passes. This wire is inserted into selected pairs of stator slots forming a coil of wire having a predetermined number of loops as the finger carries the nozzle up and down through the stator shell during operation.

The driving mechanism by which the cage and finger are actuated in predetermined sequentially timed relation with respect to each other may be of various types. It may be mechanical using hydraulic or pneumatic units to power the equipment or it may be any one of various types of servos. However, at present I prefer to use two servos of the electronic type, as shown and described herein, one of which is the finger actuating servo and the other of which is the cage actuating servo. These servos are made of servo motors, rate generators, resolvers and servo amplifiers and controls. The servos are controlled by a programming mechanism which determines the extent of the up and down movement of the winding finger and the extent of the back and forth rotary movement of the cage, and by an electrical preset countermechanism which determines the number of loops of wire in each pair of stator slots and the order in which selected pairs of slots are successively wound.

The winding mechanism is designed to automatically successively wind a predetermined number of loops of wire into selected pairs of stator slots until the stator is completely wound by first winding the wire into a plurality of pairs of slots with the tops and bottoms of the loops disposed in the outermost groove or zone of the end caps, behind the outermost annular flange associated therewith. The wire is then wound into other pairs of slots with the tops and bottoms of the loops disposed in the intermediate groove or zone of the end caps, behind the intermediate annular flange associated therewith, and finally wound into still other pairs of slots with the tops and bottoms of the loops disposed in the innermost groove or zone of the end caps, behind the innermost annular flange associated therewith.

In operation the winding finger carries the threading nozzle up and down, through a stator shell being wound and having the end caps applied thereto, between an uppermost position above and slightly behind the outermost top cap flange and a lowermost position below and slightly behind the outermost bottom cap flange with a dwell in the movement thereof at the uppermost and lowermost positions, during which dwells the cage is rotated in first one direction and then the reverse to bring first one stator slot of a selected pair of stator slots into register with the threading nozzle and then the other stator slot of the selected pair into register with the threading nozzle. As the nozzle is moved downwardly it inserts the wire into the registering stator slot, and then as the stator shell and the cage are rotated during the low position dwell of the nozzle to bring the other slot of the selected pair of slots into register therewith it lays the wire in the outermost zone of the bottom cap behind the outermost flange thereof. During the upward movement of the nozzle it inserts the wire into the then registering stator slot, and then as the stator shell is rotated in the reverse direction during the high position dwell of the nozzle to bring the first stator slot back into register with the nozzle it lays the wire in the outermost zone of the top cap behind the outermost flange thereof which completes one loop. This operation is repeated until the predetermined number of loops have been wound into this pair of slots, after which the back and forth movement of the cage is automatically changed to successively alternately bring first one slot and then the other slot of another selected pair of slots into register with the nozzle. After the selected number of pairs of slots have been wound with the tops and bottoms of the loops disposed in the outermost zones of the caps behind the outermost flanges thereof, the movement of the winding finger is automatically changed so that the nozzle is carried up and down between an uppermost position above and slightly behind the intermediate top cap flange and a lowermost position below and slightly behind the intermediate bottom cap flange, and at the same time the back and forth rotation of the cage and shell therein is changed in accordance with the location of the slots of other selected pairs of slots to be wound with the tops and bottoms of the loops disposed in the intermediate zones of the caps between the intermediate and outermost flanges thereof. Finally the movement of the winding finger is again automatically changed so that it carries the threading nozzle up and down between an uppermost position above and slightly behind the innermost top cap flange and a lowermost position below and slightly behind the innermost bottom cap flange, and at the same time the back and forth rotation of the cage and shell therein is changed in accordance with the location of the slots of still other selected pairs of slots which are to be wound with the tops and bottoms of the loops disposed in the innermost zones of the caps between the innermost and intermediate flanges thereof.

In view of the fact that in many types of stators the stators slots are not parallel to the axis of the stator but are disposed at a slight angle with respect thereto, as shown herein, means is provided by which the cage is slightly rotated during the up and down movement of the nozzle in the proper direction and speed to always maintain the section of a slot directly opposite the nozzle in the plane of the nozzle path.

The construction and operations of the mechanism will now be specifically described in connection with the drawing by reference characters. The mechanism as shown herein is designed to wind a stator shell S having twenty equally spaced helically inclined stator slots therein which are consecutively numbered 1 to 20.

Before winding a pair of similar end caps C are applied to the stator shell S, one at each end thereof. Each cap C comprises a base 25 and three spaced upwardly and outwardly extending concentric annular flanges 26, 27 and 28 of progressively different heights, the outermost flange 28 being the highest, the intermediate flange 27 the next highest and the innermost flange 26 the lowest. The flanges 26, 27 and 28 define three concentric annular grooved zones, 29 being the innermost zone, 30 the intermediate zone and 31 the outermost zone. The flanges 26, 27 and 28 are each provided with a different number of vertical slots 32 which are adapted to register with certain preselected stator slots of the stator shell S. The number and location of the slots 32 in flanges 26, 27 and 28 is dependent upon the setting of the winding mechanism and the sequence in which various preselected pairs of stator slots are to be wound by the winding mechanism.

As shown herein the winding mechanism is set to first wind the slots 5 and 6 and then the slots 1 and 10 with the tops and bottoms of the winding loops being disposed in the outermost zones 31 behind the outermost flanges 28 of the end caps C. The slots 4 and 7 are then the slots 2 and 9 are next wound with the tops and bottoms of the winding loops being disposed in the intermediate zones 30 behind the intermediate flanges 27 of the end caps C. Finally the slots 3 and 8 are wound with the tops and bottoms of the winding loops being disposed in the innermost zones 29 behind the flanges 26 of the end caps C. After the first ten stator slots have been wound the winding cage and the stator shells therein are automatically rotated 180° and then the other ten stator slots are wound in the following order: 15 and 16, 11 and 20, 14 and 17, 12 and 19, and finally 13 and 18. The tops and bottoms of the winding loops between slots 15 and 16, and between 11 and 20 are disposed in the outermost zones 31 of the caps C. The tops and bottoms of the winding loops between the slots 14 and 17 and between slots 12 and 19 are disposed in the intermediate zones 30 of the end caps C, and the tops and bottoms of the winding loops between the slots 13 and 18 are disposed in the innermost zones 29 of the end caps C.

The innermost flange 26 of the end caps C therefore has twenty slots 32 therein to register with all twenty of the stator slots. The intermediate flange 27 has sixteen slots 32 therein which are adapted to register with stator slots 1, 2, 4, 5, 6, 7, 9, 10, 11, 12, 14, 15, 16, 17, 19 and 20, and the outermost flange 28 has eight slots 32 therein which are adapted to register with stator slots 1, 5, 6, 10, 11, 15, 16 and 20 respectively. If the winding mechanism was set to wind preselected pairs of stator slots in a different sequence the flanges 26, 27 and 28 would then be slotted accordingly.

The winding mechanism by which preselected pairs of stator slots of a stator shell S having twenty stator slots therein are automatically wound in the sequence previously stated comprises a vertically disposed open ended cylindrical cage 35 which is rotatably supported by an anti-friction bearing 36 which is suitably secured in fixed position on a table 37. The cage 35 is provided with an annular gear flange 38 around the upper end thereof through which the cage 35 is rotated back and forth during operation. The cage 35 is adapted to receive a stator shell S having the end caps C applied thereto and hold it in definite fixed position by dowel 110 and by means of a pair of spring fingers 39 carried by the cage 35.

Figure 1:
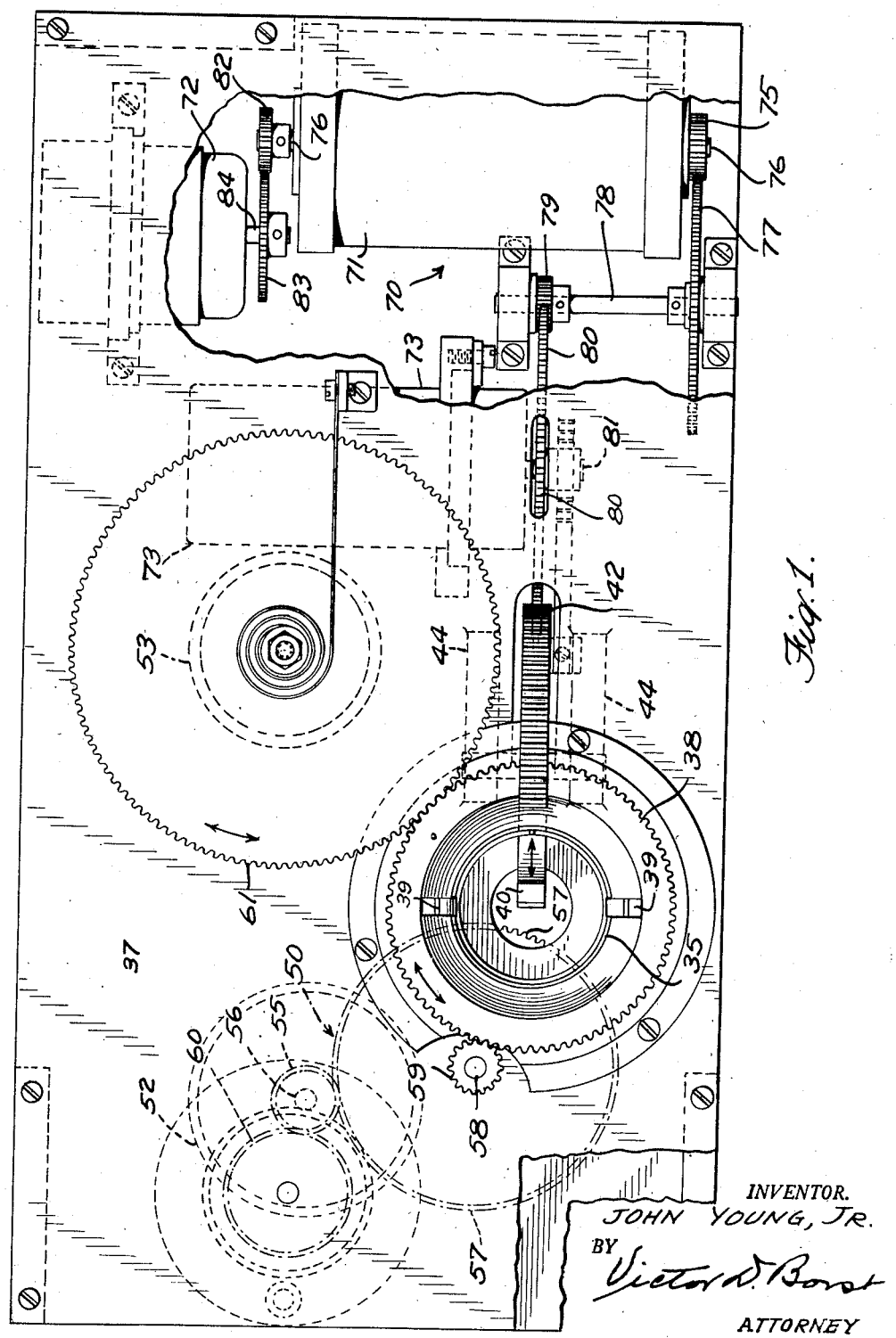
Fig. 1 is a plan view, partially broken away, of a stator winding mechanism embodying my invention.
Figure 2:
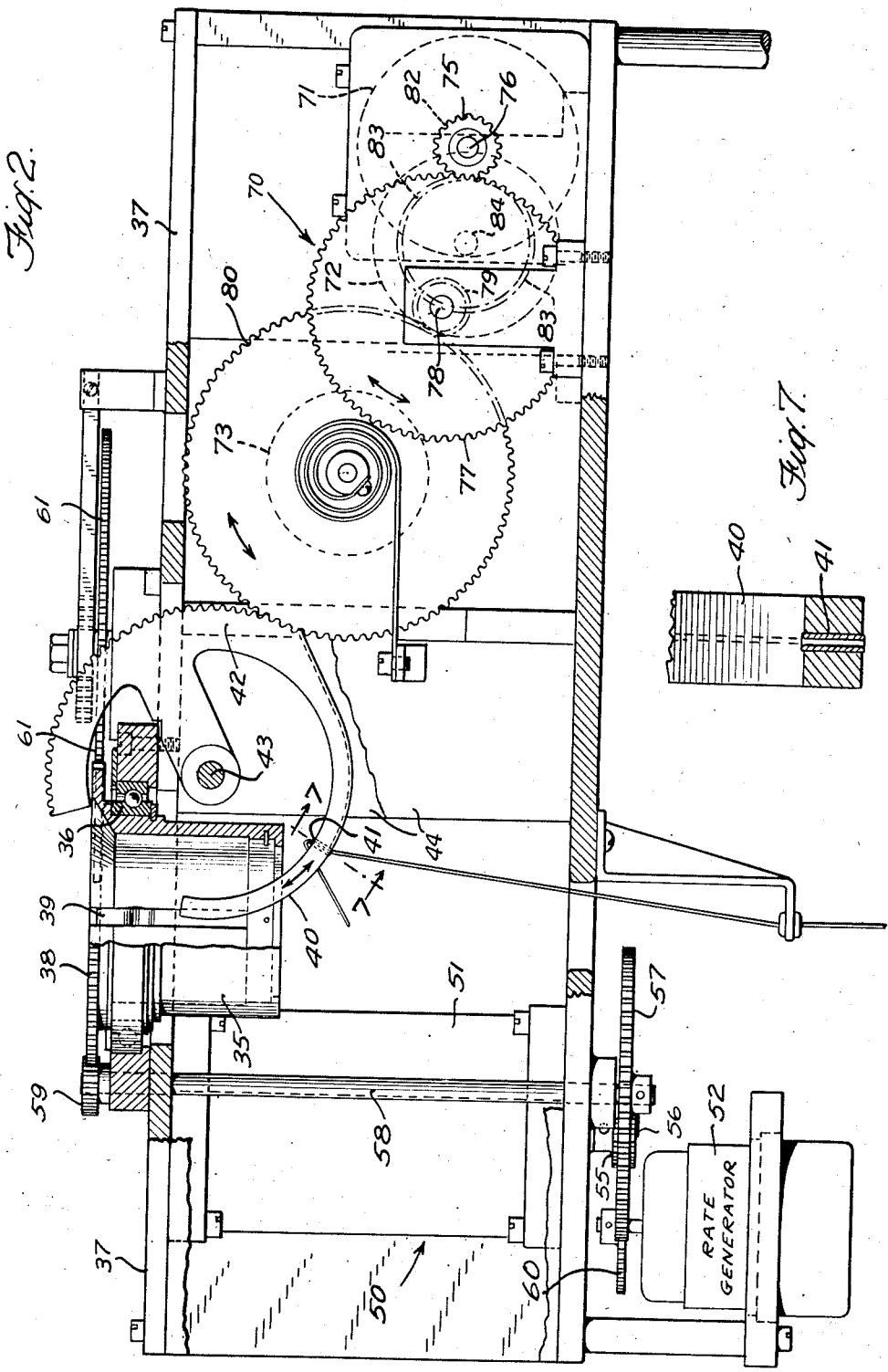
Fig. 2 is a front elevation, partially broken away, of the winding mechanism shown in Fig. 1.
Figure 3:
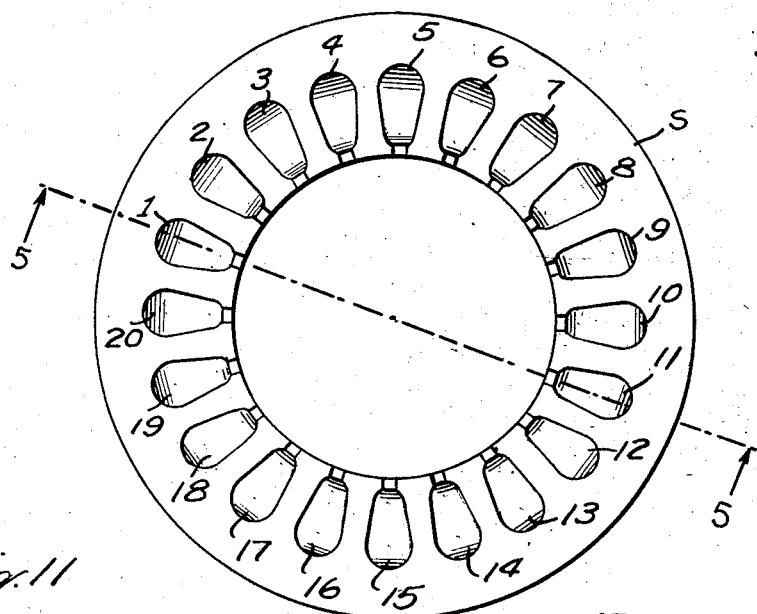
Fig. 3 is a plan view of a stator shell of the type adapted to be wound by the winding mechanism shown in Figs. 1 and 2.
Figure 6:
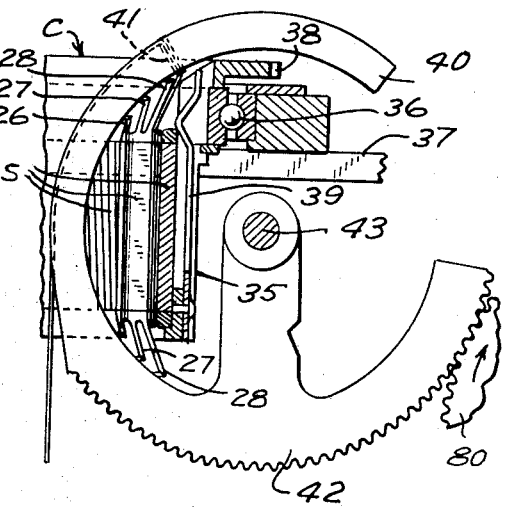
Fig. 6 is a fragmentary vertical sectional view showing a shell being wound.
Figure 4:
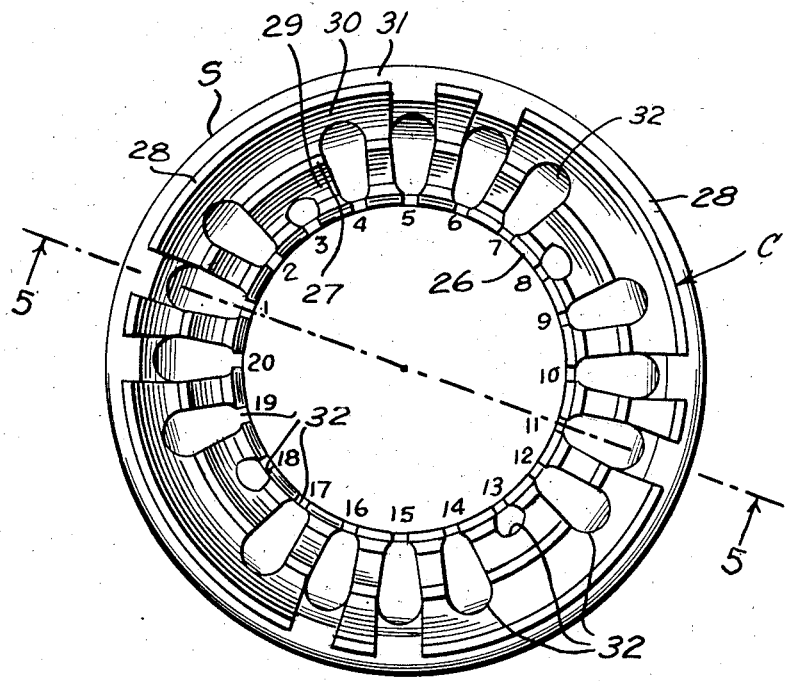
Fig. 4 is a view similar to Fig. 3 showing an end cap applied to the shell preparatory to winding.

The winding finger 40 having a threading nozzle 41 is formed integrally with or otherwise secured to a segmental gear 42 which is rotatably mounted upon a horizontal shaft 43 carried by brackets 44 secured to and extending downwardly from the underside of the table 37. The finger 40 and gear 42 are disposed radially with respect to the cage 35 with the finger 40 extending up through the open lower end of the cage 35 and a stator shell S therein. In operation the segmental gear 42 and the finger 40 carried thereby are rotated back and forth between the lower position of the finger 40 as shown in Fig. 2 and the upper position as shown in Fig. 6, which carries the threading nozzle 41 alternately up and down through the stator shell S within the cage 35.

The finger 40 with the nozzle 41 carried thereby, and the cage 35 with the stator shell S therein, are actuated in sequentially timed relation with respect to each other by two servo mechanisms which are generally indicated by the numerals 50 and 70. The servo mechanism 50 which rotates the cage 35 back and forth about a vertical axis during operation comprises the servo motor 51, the rate generator 52, the resolver 53 and the servo control and amplifier 54. The cage 35 is driven by the servo motor 51 through a pinion gear 55 which is secured to the armature shaft 56 of the servo motor 51, the gear 57 which is secured to the lower end of a shaft 58 in mesh with the gear 55, and a gear 59 which is secured to the upper end of the shaft 58 in mesh with the gear 38 carried by the cage 35. The rate generator 52 is driven by the servo motor 51 through a gear 60 which meshes with the pinion gear 55, and the resolver 53 is driven through a gear 61 which meshes with the cage gear 38. The servo mechanism 70 which rotates the finger 40 and nozzle 41 up and down about a horizontal axis during operation comprises the servo motor 71, the rate generator 72, the resolver 73, and the servo control and amplifier 74. The finger 40 is driven by the servo motor 71 through a pinion gear 75 which is secured to the armature shaft 76 of the servo motor 71, the gear 77 which is secured to one end of a horizontal shaft 78 in mesh with the gear 75, a gear 79 which is secured to the other end of the shaft 78 in mesh with a gear 80 which in turn meshes with the segmental gear 42 to which the finger 40 is secured. The resolver 73 is driven by the gear 80 which is secured to the rotor shaft 81 thereof. The rate generator 72 is driven by the servo motor 71 through a pinion gear 82 which is secured to the other end of the servo motor armature shaft 76 and a meshing gear 83 secured to the rotor shaft 84 of the rate generator 72. The timed sequential operation of the servo mechanisms 50 and 70 is controlled by a programming mechanism which comprises various network boxes, switches and relays, and a preset electric counter mechanism, which determines the order in which the pairs of stator slots are wound and the number of winding loops which are wound in each pair of stator slots.

The construction and operation of the programming and control mechanism by which the entire winding mechanism is automatically controlled will now be described in connection with Figs. 10 and 10A of the drawings. This mechanism comprises generally the preset electric counter 90, the network 91 having the variable resistors 92, the network 93 having the variable resistors 94, the stepping switches 95 and 96, and the control switching mechanisms 97, 98, 99, 100, 101 and 102. The preset counter controls the number of loops of wire wound into each pair of stator or rotor shell slots, and the sequential order in which successive pairs of slots are wound. The network 91 and the variable resistors 92 thereof control the amplitude of the rotation of the cage 35 in each direction in accordance with the relative location of a pair of slots being wound as selected by the counter 90; and the network 93 and resistors 94 thereof controls the amplitude of the movement of the finger 40 and nozzle 41 in each direction when threading the winding wire into pairs of slots as selected by the counter 90. The stepping switch 95 effects the reversing of the movement of the cage 35 after it reaches the limit of its movement in each direction as determined by the network 91; and the stepping switch 96 effects the reversing of the movement of the finger 40 after it reaches the limit of its movement in each direction as determined by the network 93. The selective operation of the network 91 is controlled by the counter 90 through the switching mechanisms 97 and 98 and a suitable relay 103 by which the switching mechanism 98 is actuated in conjunction with the switch 97; and the selective operation of the network 93 is controlled by the counter 90 through the switching mechanisms 97 and 99 and a suitable relay 104 by which the switching mechanism 99 is actuated in conjunction with the switching mechanism 97. The opening and closing of the stepping switches 95 and 96 is effected by the relays 105 and 106 respectively, and the energization of the relays 105 and 106 by which the stepping switches 95 and 96 are actuated is controlled by the switch 100; and the opening and closing of the switch 100 is controlled by the rate generators 52 and 72 through the stepping switch control and amplifier 107. It will thus be seen that the dwells in the movement of the cage 35 and finger 40, at the limit of their movement in each direction, is controlled by the rate generators 52 and 72 through the stepping switch control and amplifier 107 and the switch 100 in conjunction with the operation of the networks 91 and 93 as determined by the counter 90 for a selected pair of slots being wound.

The slight rotary movement of the cage 35 during the up and down movement of finger 40, when winding helically inclined slots, by which the section of a slot directly opposite the nozzle 41 is always maintained in the plane of the nozzle path, is controlled by the switching mechanism 101 and a network 108 in conjunction with the network 91.

The rotation of the cage 35 through 180 preparatory to winding the slots 11 to 20 is controlled by the counter 90 through the switching mechanism 97 and the switching mechanism 102 which inverts the sine and cosine leads of the resolver 53.

There are variations in the types of servos that can be used. I have shown and described an electronic one, but I could use magnetic amplifiers or I could use hydraulic or pneumatic units to power and operate the apparatus. The feedback mechanism does not have to be the resolver shown but could be a potentiometer or other rotary type or even a synchro, and the signal members do not have to be resistance networks. They could be either a series of synchros that were preset or one synchro which had a ratchet mechanism to change it from one position to the other. The whole system does not have to be as flexible as shown, for if it were set for winding one particular stator or rotor in large quantities it could be rigidized and made mechanical instead of electrical. The electrical programming and control mechanism shown and described gives flexibility, but the control of the sequential operation of the apparatus does not have to be done by an electrical preset counter but can be done by a number of different devices, one of which is a limit stop and another of which is an intermittant drive.

It is therefor apparent that the specific programming and control mechanism shown and described herein per se constitutes no part of the invention as various other means may be provided for controlling the sequential operation of the apparatus.

In Figs. 11 to 13 of the drawings I have shown a slightly modified form of winding mechanism in which a second winding finger 200, similar to the winding finger 40, is employed. The winding finger 200 is disposed in alignment with the finger 40 and is rotatably mounted upon a suitable shaft 201 carried by brackets 202 secured to and extending downwardly from the underside of the table 37. The finger 200 is provided with gear teeth 203 which mesh with gear teeth 204 on the finger 40, through which the finger 200 is driven in unison with the finger 40 by the gear 80. The finger 200 will then wind the slots 11 to 20 simultaneously with the winding of the slots 1 to 10 by the finger 40 in the following order as is diagrammatically shown in Fig. 8. While the finger 40 is winding the slots 5 and 6 the finger 200 will wind the slots 15 and 16; while the finger 40 is winding the slots 1 and 10 the finger 200 will wind the slots 11 and 20; while the finger 40 is winding the slots 4 and 7 the finger 200 will wind the slots 14 and 17; while the finger 40 is winding the slots 2 and 9 the finger 200 will wind the slots 12 and 19, and while the finger 40 is winding the slots 3 and 8 the finger 200 will wind the slots 13 and 18. This will eliminate the necessity of rotating stator shell S and the cage 35 180° after the slots 1 to 10 have been wound preparatory for the winding of slots 11 to 20, and will materially decrease the time required for completely winding a stator shell. In this form of the invention the fingers 40 and 200 and the cage 35 are all driven in timed sequential relation with respect to each by the same actuating and control mechanism used in connection with the form of winding mechanism shown in Figs. 1 to 10.

In Figs. 14 to 16 of the drawing I have shown still another form of the invention in which three winding fingers 205, 206 and 207, in addition to the finger 40, are employed. These four fingers are all similar and are geared together for operation in unison by the gear 80. The fingers 205 and 207 are geared to the finger 40 as indicated at 208 and 209 respectively and the finger 206 is geared to the finger 205 as indicated at 210. Otherwise this form of the invention is identical with that shown in Figs. 1 to 10.

In Figs. 17 and 18 I have shown the winding mechanism of Figs. 1 to 10 adapted for the winding of rotors of small motors, generators, etc., instead of stators therefor. In this form of the invention I substitute a rotatable spindle 215 for the cage 35, and I secure the gear 38 of the cage 35 to the spindle 215. I also substitute a winding finger 216, shaped as shown, for the finger 40. The spindle 215 is driven by the gear 59 and the finger 216 is driven by the gear 80; and the gears 59 and 80 are driven in sequentially timed relation with respect to each other by the same mechanism and the same manner as they are driven in the form of the invention shown in Figs. 1 to 10. In operation a rotor R having the slots 217 is removably secured in place on the spindle 215 by a nut 218 and positioning pin 219. Then during the rotation of the spindle 215 and the finger 216 selected pairs of slots 217 of the rotor R will be wound in the same manner and in the same sequence as the slots 1 to 20 of the stator S. In winding rotors the end caps C may be dispensed with, as the winding wire is always drawn inwardly in the rotor slots 217 instead of outwardly as is the case in the winding of stators.

From the foregoing it will be apparent to those skilled in this art that I have provided a very simple and efficient means for accomplishing the objects of the invention.

And it is to be understood that I am not limited to the specific constructions shown and described herein as various modifications may be made therein within the spirit of the invention and the scope of the appended claims. For instance the axially rotating finger 40 could be replaced by a member which is moved vertically up and down, or one which will swing out and deliver the winding wire at a greater radius than that shown.

I claim:

1. A winding mechanism for slotted shells of electrical apparatus by which coils comprising a plurality of loops of winding wire are automatically wound into selected pairs of shell slots, said mechanism comprising a rotatably mounted shell support adapted to hold and rotate a slotted shell back and forth during winding thereof, a winding finger disposed in operative relation to said shell support for back and forth rotation in an arcuate path about an axis perpendicular to the axis of said shell support, a threading nozzle through which winding wire is threaded into a pair of slots in a slotted shell being wound during the movement of said finger, said nozzle being carried by said finger, finger actuating means by which said finger is rotated back and forth between selected predetermined limits of movement in each direction with a dwell in the movement thereof at the limit of its movement in each direction, rotating means by which said shell support is rotated back and forth between selected predetermined limits of rotation in each direction with a dwell in the rotation thereof at the limit of its rotation in each direction, and control mechanism for said finger actuating means and said shell support rotating means by means of which said shell support and said finger are actuated in predetermined sequence with respect to each other.

2. A winding mechanism for slotted stators of electrical apparatus by which coils comprising a plurality of loops of winding wire are automatically wound into selected pairs of stator slots, said mechanism comprising an open ended rotatably mounted cylindrical cage adapted to hold and rotate a slotted stator back and forth during winding thereof, an arcuate winding finger operatively mounted adjacent said cage for back and forth rotation through said cage and a stator held therein about an axis perpendicular to the axis of rotation of said cage, a threading nozzle through which winding wire is threaded into a pair of slots in a stator being wound during the back and forth rotation of said finger through said stator and cage, said nozzle being carried by said finger, finger actuating means by which said finger is rotated back and forth between selected predetermined positions above and below a stator held in said cage with a dwell in the movement thereof at its limit of movement in each direction, rotating means by which said cage is rotated back and forth between selected predetermined limits of movement in each direction with a dwell in the movement thereof at the limit of its movement in each direction, and control mechanism for said finger actuating means and said cage rotating means by means of which said cage and said finger are actuated in predetermined sequence with respect to each other in which the movement of said cage occurs during the dwells in the movement of said finger.

3. A winding mechanism for slotted stators of electrical apparatus by which coils comprising a plurality of loops of winding wire are automatically wound into selected pairs of stator slots, said mechanism comprising an open ended rotatably mounted cylindrical cage adapted to hold and rotate a slotted stator back and forth during winding thereof, a plurality of arcuate winding fingers rotatably mounted adjacent said cage for back and forth rotation through said cage and a stator held therein, a plurality of threading nozzles through each of which winding wire is threaded into a selected pair of slots in a stator being wound during the back and forth movement of said fingers through said stator and cage, one of said nozzles being carried by each of said fingers, finger actuating means by which said fingers are rotated back and forth in unison between selected predetermined positions above and below a stator held in said cage with a dwell in the movement thereof at the limit of their movement in each direction, rotating means by which said cage is rotated back and forth between selected predetermined limits of movement in each direction with a dwell in the movement thereof at its limit of movement in each direction, and control mechanism for said finger actuating means and said cage rotating means by means of which said cage and said fingers are actuated in predetermined sequence with respect to each other.

4. A winding mechanism for slotted shells of electrical apparatus by which coils comprising a plurality of loops of winding wire are automatically wound into selected pairs of shell slots, said mechanism comprising a rotatably mounted shell support adapted to hold and rotate a slotted shell back and forth during winding thereof, a plurality of winding fingers disposed in operative relation to said shell support for back and forth rotation about an axis perpendicular to the axis of said shell support, a plurality of threading nozzles through each of which a winding wire is threaded into a selected pair of slots in a shell being wound during the back and forth movement of said fingers, one of said nozzles being carried by each of said fingers, finger actuating means by which said fingers are rotated back and forth in unison between selected predetermined positions above and below a shell held in said shell support with a dwell in the movement thereof at their limit of movement in each direction, rotating means by which said shell support is rotated back and forth between selected predetermined limits of movement in each direction with a dwell in the movement thereof at its limit of movement in each direction, and control mechanism for said finger actuating means and said shell support rotating means by means of which said shell support and said fingers are actuated in predetermined sequence with respect to each other.

5. A winding mechanism as defined in claim 2 in which said cage is provided with a gear through which said cage is rotated back and forth by said cage rotating means, and in which said cage rotating means comprises an electronically controlled servo mechanism operatively connected to said gear.

6. A winding mechanism as defined in claim 5 in which said servo mechanism comprises a servo motor, a rate generator, and a resolver, said cage, said rate generator, and said resolver all being driven by said servo motor through suitable gearing, and said rate generator and said resolver being operative in response to said control mechanism to determine the limits of movement in each direction of said cage.

7. A winding mechanism as defined in claim 2 in which said winding finger is provided with a segmental gear through which said finger is rotated back and forth by said finger actuating means, and in which said finger actuating means comprises an electronically controlled servo mechanism operatively connected to said segmental gear.

8. A winding mechanism as defined in claim 7 in which said servo mechanism comprises a servo motor, a rate generator, and a resolver, said finger, said rate generator, and said resolver all being driven by said servo motor through suitable gearing, and said rate generator and said resolver being opeartive in response to said control mechanism to determine the limits of movement in each direction of said finger.

9. A winding mechanism as defined in claim 2 in which said cage rotating mechanism comprises a first electronically controlled servo mechanism operatively connected to said cage, and said finger actuating mechanism comprises a second electronically controlled servo mechanism operatively connected to said finger.

10. A winding mechanism as defined in claim 9 in which said first servo mechanism comprises a servo motor, a rate generator, and a resolver, said cage, said rate generator, and said resolver all being driven by said servo motor through suitable gearing, said rate generator and said resolver being operative in response to said control mechanism to determine the limits of movement in each direction of said cage; and said second servo mechanism comprising a servo motor, a rate generator, and a resolver, said finger, said rate generator, and said resolver all being driven by said servo motor through suitable gearing, and the rate generator and resolver of said second servo mechanism being operative in response to said control mechanism to determine the limits of movement in each direction of said finger.

11. A winding mechanism as defined in claim 10 in which said control mechanism comprises a preset electric counter mechanism, network boxes, and relays, which in combination with each other control the sequential operation of said first and said second servo mechanisms and determine the order in which selected pairs of stator slots are successively wound and the number of winding loops which are wound into each pair of stator slots.

12. A winding mechanism for slotted shells of electrical apparatus by which coils comprising a plurality of loops of winding wire are automatically wound into selected pairs of shell slots, said mechanism comprising a rotatably mounted shell support adapted to hold and rotate a slotted shell back and forth during winding thereof, a winding finger disposed in operative relation to said shell support for back and forth rotation in an arcuate path about an axis perpendicular to the axis of rotation of said shell support, a threading nozzle through which winding wire is threaded into a pair of slots in a slotted shell being wound during the rotation of said finger, said nozzle being carried by said finger, finger actuating means by which said finger is rotated back and forth between selected predetermined limits of movement in each direction with a dwell in the movement thereof at the limit of its movement in each direction, rotating means by which said shell support is rotated back and forth between selected predetermined limits of movement in each direction with a dwell in the movement thereof at the limit of its movement in each direction, and control mechanism for said finger actuating means and said shell support rotating means by means of which said shell support and said finger are actuated in predetermined sequence with respect to each other.

13. A winding mechanism for slotted shells of electrical apparatus by which coils comprising a plurality of loops of winding wire are automatically wound into selected pairs of shell slots, said mechanism comprising a rotatably mounted shell support adapted to hold and rotate a slotted shell back and forth during winding thereof, a winding finger disposed in operative relation to said shell support for back and forth rotation about an axis perpendicular to the axis of said shell support, a threading nozzle through which winding wire is threaded into a pair of slots in a slotted shell being wound during the movement of said finger, said nozzle being carried by said finger, finger actuating means by which said finger is rotated back and forth between selected predetermined limits of movement in each direction with a dwell in the movement thereof at the limit of its movement in each direction, rotating means by which said shell support is alternately rotated back and forth with a dwell in the movement thereof at the end of its movement in each direction to thereby bring first one slot of a pair of slots being wound and then the other slot of said pair of slots into register with said winding finger, said rotating means being also operative to slightly rotate said shell support during back and forth movement of said finger in the proper direction and speed to maintain the sections of ahelically inclined slot directly opposite said nozzle in the plane of the nozzle path, and control mechanism for said finger actuating means and said shell support rotating means by means of which said shell support and said finger are actuated in predetermined sequence with respect to each other whereby the movement of said shell support to alternately bring said slots into register with said finger occurs during the dwells in the movement of said finger.

14. A winding mechanism for slotted shells of electrical apparatus by which coils comprising a plurality of loops of winding wire are automatically wound into selected pairs of shell slots, said mechanism comprising a rotatably mounted shell support adapted to hold and rotate a slotted shell back and forth during winding thereof, a winding finger disposed in operative relation to said shell support for back and forth rotation about an axis perpendicular to the axis of said shell support, a threading nozzle through which winding wire is threaded into a pair of slots in a slotted shell being wound during the movement of said finger, said nozzle being carried by said finger, finger actuating means by which said finger is rotated back and forth between selected predetermined limits of movement in each direction with a dwell in the movement thereof at the limit of its movement in each direction, rotating means by which said shell support is alternately rotated back and forth with a dwell in the movement thereof at the end of its movement in each direction to thereby bring first one slot of a pair of slots being wound and then the other slot of said pair of slots into register with said winding finger, said rotating means being also operative to slightly rotate said cage during back and forth movements of said finger in the proper direction and speed to maintain the sections of a helically inclined slot directly opposite said nozzle in the plane of the nozzle path, and control mechanism for said finger actuating means and said shell support rotating means by means of which said shell support and said finger are actuated in predetermined sequence with respect to each other whereby the movement of said cage to alternately bring said slots into register will said finger occurs during the dwells in the movement of said finger.

15. A winding mechanism for slotted stators of electrical apparatus by which coils comprising a plurality of loops of winding wire are automatically wound into selected pairs of stator slots, said mechanism comprising an open ended rotatably mounted cylindrical cage adapted to hold and rotate a slotted stator back and forth during winding thereof, an arcuate winding finger operatively mounted adjacent said cage for back and forth rotation through said cage and a stator held therein, a threading nozzle through which winding wire is threaded into a pair of slots in a stator being wound during the back and forth movement of said finger through said stator and cage, said nozzle being carried by said finger, finger actuating means by which said finger is rotated back and forth between selected predetermined positions above and below a stator held in said cage with a dwell in the movement thereof at its limit of movement in each direction, rotating means by which said cage is alternately rotated back and forth with a dwell in the movement thereof at the end of its movement in each direction to thereby bring first one slot of a pair of slots being wound and then the other slot of said pair of slots into register with said winding finger, said rotating means being also operative to slightly rotate said cage during back and forth movements of said finger in the proper direction and speed to maintain the sections of a helically inclined slot directly opposite said nozzle in the plane of the nozzle path, and control mechanism for said finger actuating means and said cage rotating means by means of which said cage and said finger are actuated in predetermined sequence with respect to each other whereby the movement of said cage to alternately bring said slots into register with said finger occur during the dwells in the movement of said finger.

16. A winding mechanism for slotted rotors of electric apparatus by which coils comprising a plurality of loops of winding wire are automatically wound into selected pairs of rotor slots, said mechanism comprising a rotatably mounted spindle adapted to hold and rotate a rotor back and forth during winding thereof, a winding finger disposed in operative relation to said spindle for back and forth rotation between points above and below a rotor mounted on said spindle, a threading nozzle through which winding wire is threaded into a pair of slots in a rotor being wound during the movement of said finger, said nozzle being carried by said finger, finger actuating means by which said finger is rotated back and forth between selected predetermined limits of movement in each direction, rotating means by which said spindle is rotated back and forth between selected predetermined limits of rotation in each direction with a dwell in the rotation thereof at the limit of its rotation in each direction, and control mechanism for said finger actuating means and said spindle rotating means by means of which said spindle and said finger are actuated in predetermined sequence with respect to each other.

17. A winding mechanism for slotted rotors of electrical apparatus by which coils comprising a plurality of loops of winding wire are automatically wound into selected pairs of rotor slots, said mechanism comprising a rotatably mounted spindle adapted to hold and rotate a rotor back and forth during winding thereof, a rotatably mounted winding finger disposed in operative relation to said spindle for back and forth rotation about an axis perpendicular to the axis of said spindle, a threading nozzle through which winding wire is threaded into a pair of slots in a rotor being wound during the movement of said finger, said nozzle being carried by said finger, a finger actuating means by which said finger is rotated back and forth between selected predetermined limits of movement in each direction, rotating means by which said spindle is rotated back and forth between selected predetermined limits of rotation in each direction with a dwell in the rotation thereof at the limit of its rotation in each direction, and control mechanism for said finger actuating means and said spindle rotation means by means of which said spindle and said finger are actuated in predetermined sequence with respect to each other.

References Cited in the file of this patent

UNITED STATES PATENTS

| | | |
|---|---|---|
| 1,238,280 | Field | Aug. 28, 1917 |
| 1,331,970 | Williamson | Feb. 24, 1920 |
| 1,692,114 | Darby | Nov. 20, 1928 |
| 1,803,493 | Volet | May 5, 1931 |
| 2,304,520 | Wirtz et al. | Dec. 8, 1942 |
| 2,305,650 | Vienneau | Dec. 22, 1942 |
| 2,400,008 | Korte | May 7, 1946 |
| 2,632,602 | Weis | Mar. 24, 1953 |
| 2,647,696 | Brunand | Aug. 4, 1953 |